United States Patent
Nakamura et al.

(10) Patent No.: US 10,823,269 B2
(45) Date of Patent: Nov. 3, 2020

(54) BICYCLE ROTOR

(71) Applicant: Shimano Inc., Sakai (JP)

(72) Inventors: Kenta Nakamura, Sakai (JP); Sota Yamaguchi, Sakai (JP)

(73) Assignee: SHIMANO INC., Sakai (JP)

( * ) Notice: Subject to any disclaimer, the term of this patent is extended or adjusted under 35 U.S.C. 154(b) by 157 days.

(21) Appl. No.: 15/405,250

(22) Filed: Jan. 12, 2017

(65) Prior Publication Data

US 2018/0195598 A1 Jul. 12, 2018

(51) Int. Cl.
*F16H 55/30* (2006.01)
*B62M 9/00* (2006.01)
*F16H 55/06* (2006.01)
*B62M 9/121* (2010.01)

(52) U.S. Cl.
CPC ............ *F16H 55/06* (2013.01); *B62M 9/121* (2013.01); *F16H 55/303* (2013.01); *F16H 2055/306* (2013.01)

(58) Field of Classification Search
CPC .......... F16H 55/06; F16H 55/30; B62M 9/00; B62M 13/00; B62M 9/121
See application file for complete search history.

(56) References Cited

U.S. PATENT DOCUMENTS

| | | | |
|---|---|---|---|
| 7,814,809 B2* | 10/2010 | Shinohara | F16H 55/06 74/409 |
| 7,967,709 B2 | 6/2011 | Emura et al. | |
| 9,297,452 B2 | 3/2016 | Iwai et al. | |
| 9,746,067 B2* | 8/2017 | Cooper | F16H 55/06 |
| 2005/0178210 A1* | 8/2005 | Lanham | B62J 99/00 73/818 |
| 2009/0054183 A1* | 2/2009 | Takachi | B62M 9/121 474/80 |
| 2009/0081402 A1* | 3/2009 | Tomoda | B29C 45/14819 428/66.1 |

(Continued)

FOREIGN PATENT DOCUMENTS

| | | |
|---|---|---|
| CN | 201461900 U | 5/2010 |
| CN | 202765218 U | 3/2013 |

(Continued)

OTHER PUBLICATIONS

Designerdata, PA11 (EN), 2017, downloaded from www.designerdata.nl/plastics/thermo+plastics/PA11 (Year: 2017).*

(Continued)

*Primary Examiner* — Michael R Mansen
*Assistant Examiner* — Robert T Reese
(74) *Attorney, Agent, or Firm* — United IP Counselors, LLC

(57) ABSTRACT

A bicycle rotor comprises a base portion and at least one chain engagement portion. The base portion is configured to rotate around a rotational center axis of the bicycle rotor. The base portion is at least partly made of a first resin material. The first resin material has a first Young's modulus. The at least one chain engagement portion is provided on the base portion. The at least one chain engagement portion is at least partly made of a second resin material. The second resin material has a second Young's modulus. The first Young's modulus is higher than the second Young's modulus.

23 Claims, 11 Drawing Sheets

(56) References Cited

U.S. PATENT DOCUMENTS

| | | | |
|---|---|---|---|
| 2012/0297911 A1* | 11/2012 | Geiman | B21K 1/30 |
| | | | 74/434 |
| 2013/0310204 A1* | 11/2013 | Shahana | B62M 9/121 |
| | | | 474/80 |
| 2014/0335987 A1 | 11/2014 | Iwai et al. | |
| 2015/0362057 A1* | 12/2015 | Wesling | F16H 55/06 |
| | | | 474/152 |
| 2016/0114544 A1* | 4/2016 | Kunishima | B29C 70/462 |
| | | | 74/460 |
| 2017/0120487 A1* | 5/2017 | Brochot | B29C 45/16 |
| 2017/0284914 A1* | 10/2017 | Johnson | G01N 3/56 |
| 2018/0073619 A1* | 3/2018 | Le Roy | F16H 55/14 |
| 2018/0194431 A1* | 7/2018 | Iwai | B62M 9/10 |

FOREIGN PATENT DOCUMENTS

| | | |
|---|---|---|
| EP | 2549146 A1 | 1/2013 |
| JP | S57-204368 A | 12/1982 |

OTHER PUBLICATIONS

Second Office Action of the corresponding Chinese Application No. 201711470972.7, dated Feb. 6, 2020.

\* cited by examiner

BICYCLE ROTOR

BACKGROUND

Technical Field

The technology disclosed herein relates to a bicycle rotor.

Background Information

Bicycling is becoming a popular form of recreation as well as a means of transportation. Also, bicycling has become a popular competitive sport for both amateurs and professionals. Regardless of the bicycle is used for the recreation, the transportation or the competition, the bicycle industry is constantly improving the various components of the bicycle.

For example, a bicycle rotor such as a pulley and a sprocket has been redesigned over the past years, and is constantly being improved to stably rotate.

It is an object of the present invention to provide a bicycle rotor capable of reducing noise in traveling.

SUMMARY

In accordance with a first aspect of the present invention, a bicycle rotor comprises a base portion and at least one chain engagement portion. The base portion is configured to rotate around a rotational center axis of the bicycle rotor. The base portion is at least partly made of a first resin material. The first resin material has a first Young's modulus. The at least one chain engagement portion is provided on the base portion. The at least one chain engagement portion is at least partly made of a second resin material. The second resin material has a second Young's modulus. The first Young's modulus is higher than the second Young's modulus. According to the first aspect of the present invention, a bicycle rotor is provided in which it is possible to reduce a noise in traveling.

In accordance with a second aspect of the present invention, the bicycle rotor according to the first aspect is configured so that the at least one chain engagement portion has a driving surface. The driving surface has the second Young's modulus. According to the second aspect of the present invention, a bicycle rotor is provided in which it is possible to reduce a noise in traveling.

In accordance with a third aspect of the present invention, the bicycle rotor according to the first aspect or the second aspect is configured so that each of the first Young's modulus and the second Young's modulus is a bending Young's modulus. According to the third aspect of the present invention, a bicycle rotor is provided in which it is possible to reduce a noise in traveling.

In accordance with a fourth aspect of the present invention, the bicycle rotor according to any one of the first to third aspects is configured so that the first Young's modulus is equal to or more than 500 MPa. According to the fourth aspect of the present invention, a bicycle rotor is provided in which it is possible to suitably secure rigidity thereof.

In accordance with a fifth aspect of the present invention, the bicycle rotor according to any one of the first to fourth aspects is configured so that the first Young's modulus is equal to or more than 1200 MPa. According to the fifth aspect of the present invention, a bicycle rotor is provided in which it is possible to suitably secure rigidity thereof.

In accordance with a sixth aspect of the present invention, the bicycle rotor according to any one of the first to fifth aspects is configured so that the first Young's modulus is less than 1200 MPa. According to the sixth aspect of the present invention, a bicycle rotor is provided in which it is possible to reduce a noise in traveling.

In accordance with a seventh aspect of the present invention, the bicycle rotor according to any one of the first to sixth aspects is configured so that the second Young's modulus is less than 1,000 MPa. According to the seventh aspect of the present invention, a bicycle rotor is provided in which it is possible to reduce a noise in traveling.

In accordance with an eighth aspect of the present invention, the bicycle rotor according to any one of the first to seventh aspects to seventh is configured so that the second Young's modulus is less than 800 MPa. According to the eighth aspect of the present invention, a bicycle rotor is provided in which it is possible to reduce a noise in traveling.

In accordance with a ninth aspect of the present invention, the bicycle rotor according to any one of the first to eighth aspects is configured so that the second Young's modulus is equal to or more than 20 MPa. According to the ninth aspect of the present invention, a bicycle rotor is provided in which it is possible to reduce a noise in traveling.

In accordance with a tenth aspect of the present invention, the bicycle rotor according to any one of the first to ninth aspects is configured so that a difference between the first Young's modulus and the second Young's modulus is equal to or larger than 100 MPa. According to the tenth aspect of the present invention, a bicycle rotor is provided in which it is possible to reduce a noise in traveling while securing necessary rigidity thereof.

In accordance with an eleventh aspect of the present invention, the bicycle rotor according any one of to the first to tenth aspects is configured so that the base portion and the at least one chain engagement portion form at least one tooth. According to the eleventh aspect of the present invention, a bicycle rotor is provided in which it is possible to reduce a noise in traveling while securing necessary rigidity thereof.

In accordance with a twelfth aspect of the present invention, the bicycle rotor according to the eleventh aspect is configured so that the at least one tooth including a non-driving surface of the base portion and the driving surface of the at least one chain engagement portion. The non-driving surface has the first Young's modulus. According to the twelfth aspect of the present invention, a bicycle rotor is provided in which it is possible to reduce a noise in traveling while securing necessary rigidity thereof.

In accordance with a thirteenth aspect of the present invention, the bicycle rotor according to any one of the first to tenth aspects is configured so that the at least one chain engagement portion forms at least one tooth. According to the thirteenth aspect of the present invention, a bicycle rotor is provided in which it is possible to effectively reduce a noise in traveling.

In accordance with a fourteenth aspect of the present invention, the bicycle rotor according to any one of the first to thirteenth aspects is configured so that the at least one chain engagement portion has a driving surface configured to contact with a roller of a bicycle chain. According to the fourteenth aspect of the present invention, a bicycle rotor is provided in which it is possible to reduce a noise in traveling.

In accordance with a fifteenth aspect of the present invention, the bicycle rotor according to the fourteenth aspect is configured so that the at least one chain engagement portion further includes at least one axially outer surface. The at least one axially outer surface faces at least one link member of the bicycle chain in an axial direction parallel to a rotational center axis of the bicycle rotor. The at least one axially outer surface has the second Young's modulus. According to the fifteenth aspect of the present invention, a bicycle rotor is provided in which it is possible to effectively reduce a noise in traveling.

In accordance with a sixteenth aspect of the present invention, the bicycle rotor according to the fifteenth aspect is configured so that the at least one axially outer surface includes a first axially outer surface and a second axially outer surface. The first axially outer surface faces one of a pair of link members of the bicycle chain in the axial direction. The second axially outer surface faces the other of the pair of link members of the bicycle chain in the axial direction. According to the sixteenth aspect of the present invention, a bicycle rotor is provided in which it is possible to effectively reduce a noise in traveling.

In accordance with a seventeenth aspect of the present invention, the bicycle rotor according to any one of the first to tenth aspects is configured so that the at least one chain engagement portion includes a chain engagement portion. The chain engagement portion is provided on a radial outside of the base portion with respect to the rotational center axis and is formed in a substantially annular shape. According to the seventeenth aspect of the present invention, a bicycle rotor is provided in which it is possible to easily manufacture thereof.

In accordance with an eighteenth aspect of the present invention, the bicycle rotor according to any one of the first to seventeenth aspects is configured so that a reference circle is defined to pass through a point between a radially outermost point of the rotor and the rotational center axis. The base portion is arranged between the rotational center axis and the reference circle in the radial direction. According to the eighteenth aspect of the present invention, a bicycle rotor is provided in which it is possible to secure necessary rigidity thereof.

In accordance with a nineteenth aspect of the present invention, the bicycle rotor according to the eighteenth aspect is configured so that a proportion of a reference radius of the reference circle to a radius from the rotational center axis to the radially outermost point is equal to or more than 0.3. According to the nineteenth aspect of the present invention, a bicycle rotor is provided in which it is possible to secure necessary rigidity thereof.

In accordance with a twentieth aspect of the present invention, the bicycle rotor according to the nineteenth aspect is configured so that the proportion is equal to or more than 0.5. According to the twentieth aspect of the present invention, a bicycle rotor is provided in which it is possible to secure necessary rigidity.

In accordance with a twenty-first aspect of the present invention, a bicycle rotor comprises a base portion and at least one chain engagement portion. The base portion is configured to rotate around a rotational center axis of the bicycle rotor. The at least one chain engagement portion is configured to contact with a bicycle chain. The at least one chain engagement portion is formed integrally with the base portion. A Young's modulus of the base portion and the at least one chain engagement portion is equal to or less than 1,200 MPa. According to the twenty-first aspect of the present invention, a bicycle rotor is provided in which it is possible to reduce a noise in traveling.

In accordance with a twenty-second aspect of the present invention, the bicycle rotor according to the twenty-first aspect is configured so that the Young's modulus is equal to or more than 1,000 MPa. According to the twenty-second aspect of the present invention, a bicycle rotor is provided in which it is possible to reduce a noise in traveling while securing necessary rigidity thereof.

In accordance with a twenty-third aspect of the present invention, the bicycle rotor according to the twenty-first aspect is configured so that the Young's modulus is equal to or less than 800 MPa. According to the twenty-third aspect of the present invention, a bicycle rotor is provided in which it is possible to effectively reduce a noise in traveling.

In accordance with a twenty-fourth aspect of the present invention, the bicycle rotor according to the twenty-first aspect is configured so that the Young's modulus is equal to or more than 20 MPa. According to the twenty-fourth aspect of the present invention, a bicycle rotor is provided in which it is possible to secure necessary rigidity thereof.

BRIEF DESCRIPTION OF THE DRAWINGS

Referring now to the attached drawings, which form a part of this original disclosure.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

Figure 1:
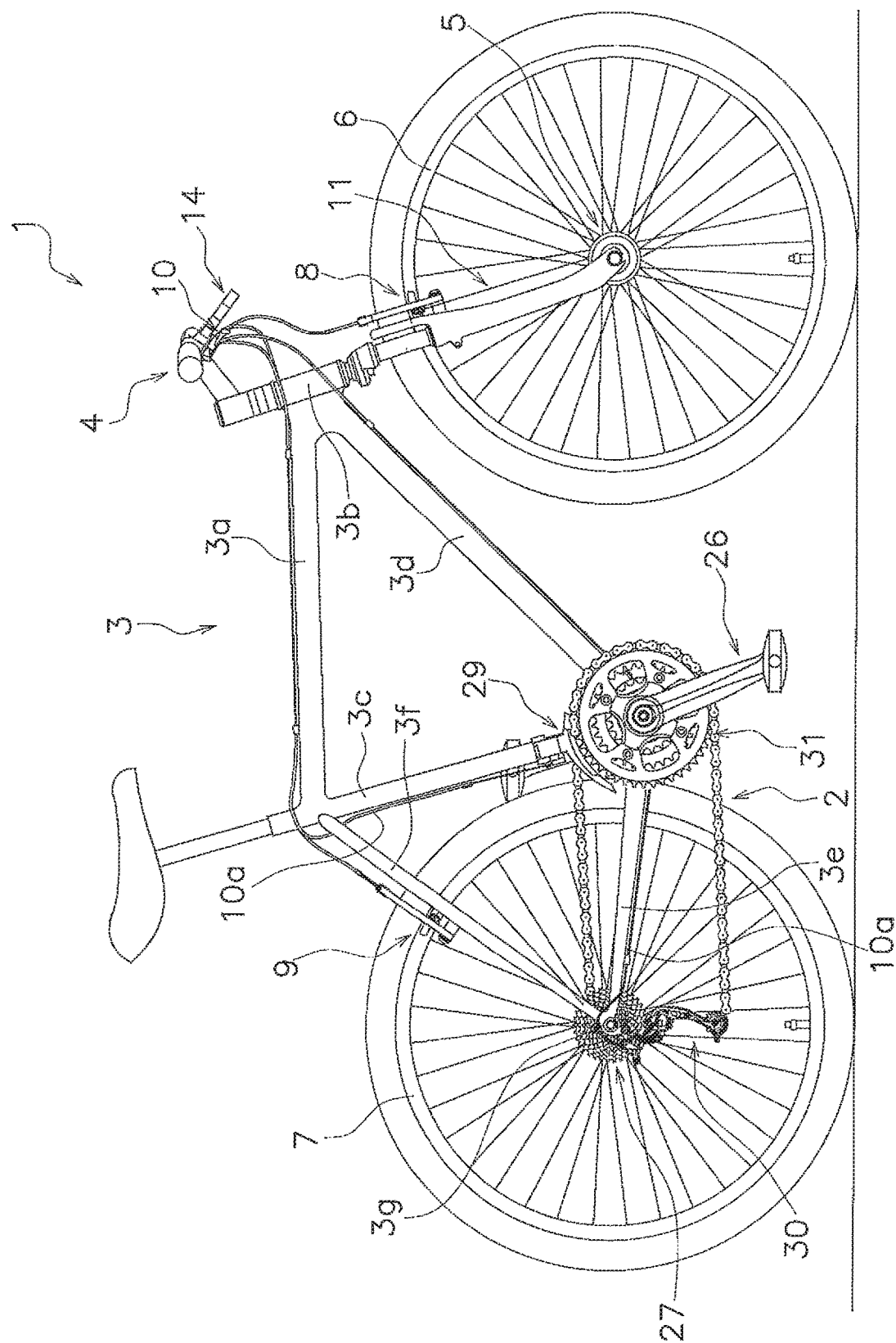
FIG. 1 is a side view of a bicycle according to an embodiment of the present invention.

As shown in FIG. 1, a bicycle 1 includes a bicycle chain 2, a bicycle frame 3, a bicycle handle bar 4, a bicycle front hub assembly 5, a bicycle front wheel 6, a bicycle rear wheel 7, a bicycle front brake device 8, a bicycle rear brake device 9, a bicycle shift operating device 10, and a driving system 25.

The bicycle frame 3 includes a top tube 3*a*, a head tube 3*b*, a seat tube 3*c*, a down tube 3*d*, a pair of chain stays 3*e*, and a pair of seat stays 3*f*. A connection portion of the chain stay 3e and the seat stay 3f is described as a pair of rear ends 3g. A front fork 11 is rotatably attached to the head tube 3b of the bicycle frame 3.

The bicycle handle bar 4 is fixed to the front fork 11. The bicycle front hub assembly 5 is supported on the front fork 11. The bicycle front wheel 6 is rotatably attached to the front fork 11 via the bicycle front hub assembly 5. The bicycle rear wheel 7 is rotatably attached to a rear portion of the bicycle frame 3 via a bicycle rear hub assembly (as described below) of the driving system 25.

The bicycle front and rear brake devices 8, 9 are operated by a bicycle brake operating device 14. The bicycle shift operating device 10 is attached to the bicycle handle bar 4. The bicycle shift operating device 10 respectively operates a bicycle front derailleur 29 and a bicycle rear derailleur 30 via a control cable 10a. The bicycle front derailleur 29 is, for example, attached to the seat tube 3c. The bicycle rear derailleur 30 is, for example, attached to the rear ends 3g of the bicycle frame 3.

As shown in FIG. 1, the driving system 25 mainly includes a bicycle crank assembly 26, a bicycle rear sprocket assembly 27, the bicycle rear hub assembly (not shown), and the bicycle front and rear derailleurs 29, 30.

The bicycle crank assembly 26 is rotatably supported on a lower portion of the bicycle frame 3, for example, a bottom bracket hanger (not shown). The bicycle crank assembly 26 is a bicycle front sprocket assembly 31. The bicycle rear sprocket assembly 27 is rotatably supported on the bicycle rear hub assembly. The bicycle rear hub assembly is mounted on a rear portion of the bicycle frame 3. Specifically, the bicycle rear hub assembly is mounted between the pair of rear ends 3g in an axial direction with respect to a rotational center axis of the bicycle rear hub assembly.

The bicycle front derailleur 29 moves the bicycle chain 2 from one front sprocket of the bicycle front sprocket assembly 31 to the other front sprocket of the bicycle front sprocket assembly 31 in accordance with an operation of the bicycle shift operating device 10.

The bicycle rear derailleur 30 moves the bicycle chain 2 from one rear sprocket of the bicycle rear sprocket assembly 27 to the other rear sprocket of the bicycle rear sprocket assembly 27 in accordance with an operation of the bicycle shift operating device 10.

Figure 2:
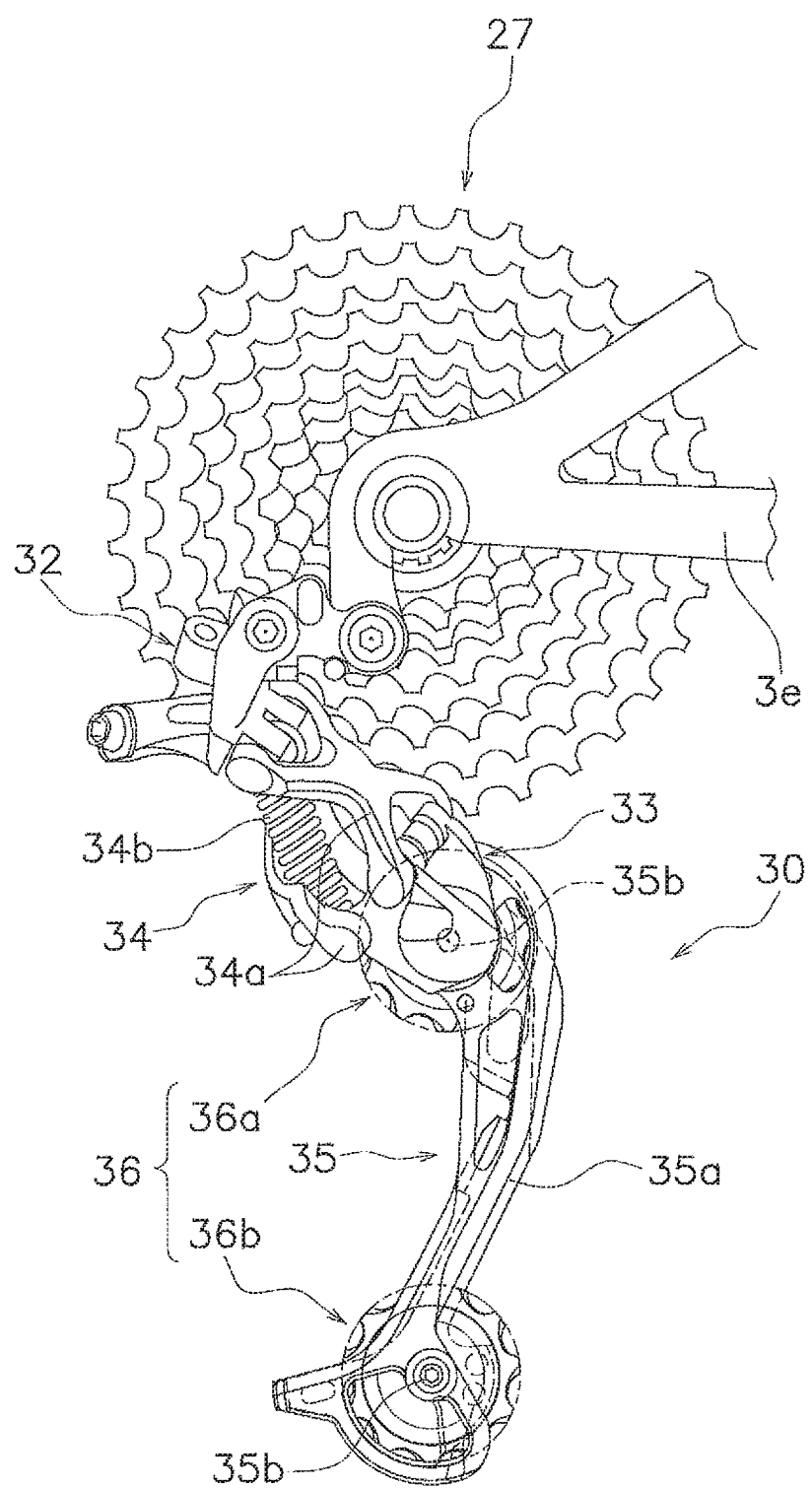
FIG. 2 is a side view of a rear derailleur.

As shown in FIG. 2, the bicycle rear derailleur 30 includes a base member 32, a movable member 33, a link structure 34, a chain guide 35, and a pulley assembly 36 (an example of a bicycle rotor).

The base member 32 is configured to be mounted to the rear end of the bicycle frame 3. The base member 32 holds an outer casing of the control cable 10a. The movable member 33 is movable with respect to the base member 32.

The link structure 34 includes a pair of link members 34a and a coil spring 34b. The movable member 33 is movably supported by the pair of link members 34a relative to the base member 32. One end of each of the link members 34a is pivotably mounted to the base member 32. The other end of each of the link members 34a is pivotably mounted to the movable member 33. One of the link members 34a hold an inner cable of the control cable 10a. The coil spring 34b is disposed between the pair of link members 34a and bias the chain guide 35 toward top side (e.g. the smallest rear sprocket side). The chain guide 35 includes a pair of chain guide plates 35a. The chain guide 35 (the pair of chain guide plates 35a) are pivotably mounted to the movable member 33.

The pulley assembly 36 includes a guide pulley 36a and the tension pulley 36b. The guide pulley 36a and the tension pulley 36b are disposed between the pair of chain guide plates 35a. The guide pulley 36a and the tension pulley 36b are rotatably mounted to the pair of chain guide plates 35a.

The pulley assembly 36 will be described below referring to FIGS. 3 and 4. The tension pulley 36b has the same configuration as the guide pulley 36a except for the first surface 47 (an example of a driving surface) and the second surface 51 (an example of a non-driving surface) that will be described below. Therefore, detailed explanation of the structure of the tension pulley 36b is omitted.

Figure 3:
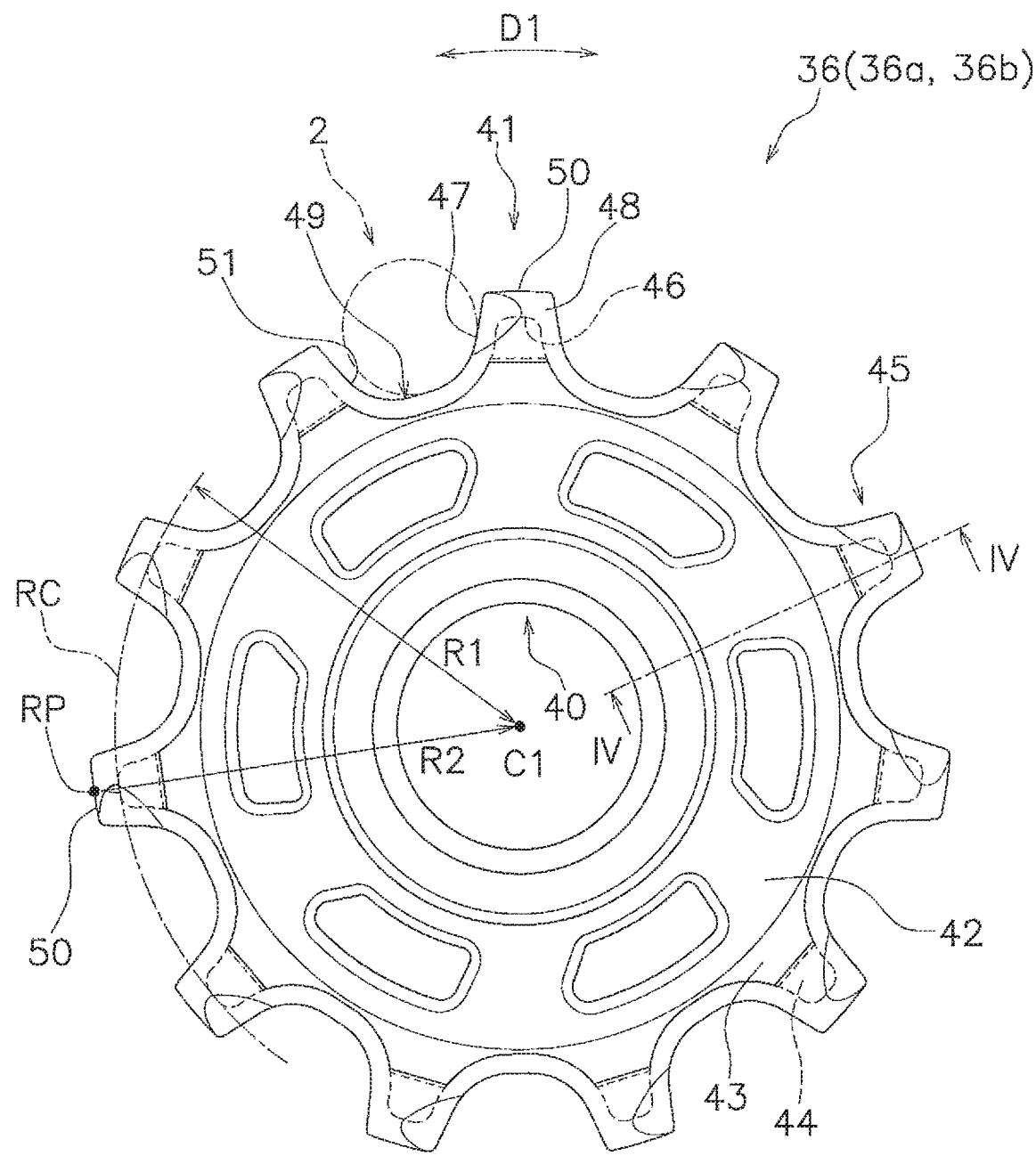
FIG. 3 is a side view of a pulley.
Figure 4:
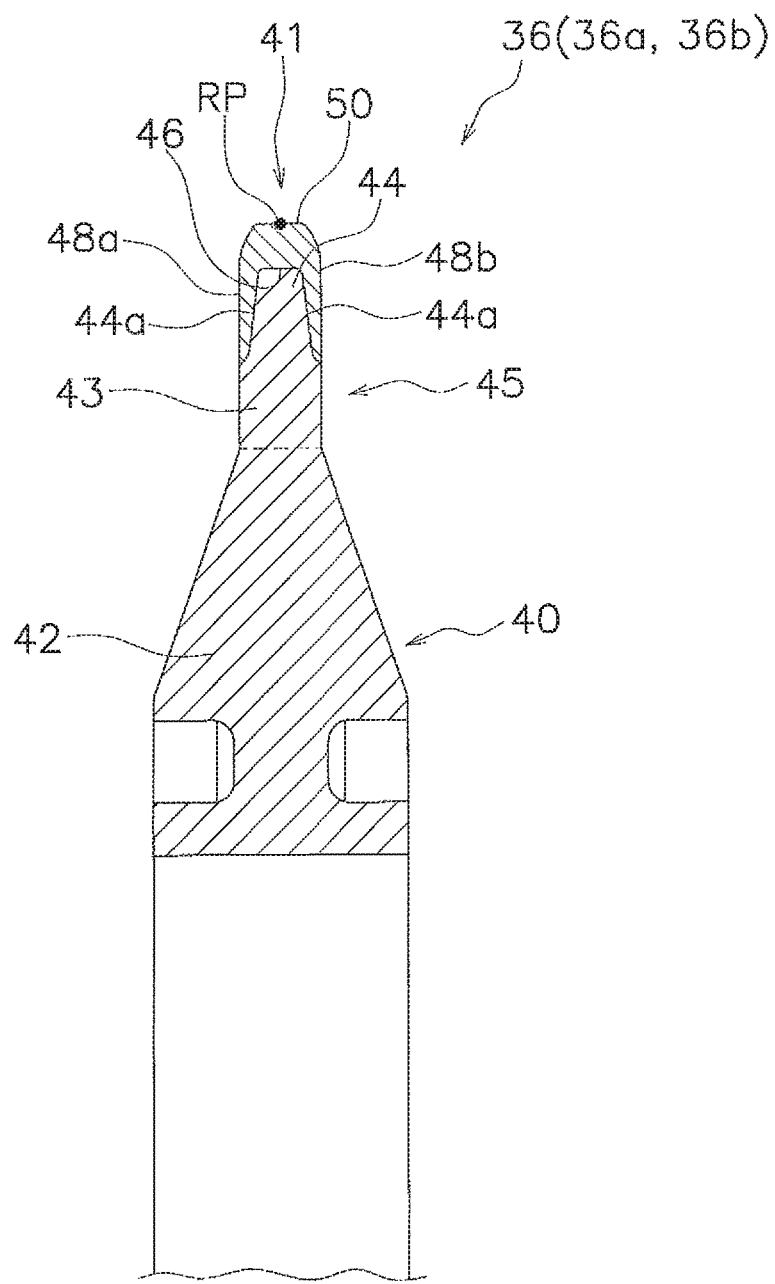
FIG. 4 is a partially enlarged cross-sectional view of the pulley taken along line IV-IV of FIG. 3.

As shown in FIGS. 3 and 4, the guide pulley 36a comprises a base portion 40 and a chain engagement portion 41 (an example of at least one chain engagement portion).

(Base Portion)

As shown in FIGS. 3 and 4, the base portion 40 is configured to rotate around a rotational center axis C1. The base portion 40 is at least partly made of a first resin material. In this embodiment, the base portion 40 is made of the first resin material. The configuration of the first resin material is described below.

Specifically, the base portion 40 includes a disc portion 42 and a plurality of protruding portions 43.

The disc portion 42 is formed in a substantially annular shape. The disc portion 42 is disposed between the pair of chain guide plates 35a. The disc portion 42 is rotatably mounted to the pair of chain guide plates 35a via a shaft member 35b (see FIG. 2). Preferably, the disc portion 42 is rotatably mounted to the pair of chain guide plates 35a via a bearing (not shown) on the shaft member 35b.

The plurality of protruding portions 43 respectively protrude from an outer peripheral portion of the disc portion 42 in a radial direction with respect to the rotational center axis C1.

Each of the protruding portions 43 is integrally formed on the outer peripheral portion of the disc portion 42. Each of the protruding portions 43 is disposed at intervals in a circumferential direction D1 with respect to the rotational center axis C1.

Each of the protruding portions 43 includes a first attachment portion 44. The first attachment portion 44 is configured to be attached to the chain engagement portion 41. The first attachment portion 44 is formed on a distal end side of each of the protruding portions 43.

For example, as shown in FIG. 4, each of axially outer surfaces 44a of the first attachment portion 44 is formed in a substantially stepped shape. Minimum width of the first attachment portion 44 is smaller than maximum width of the protruding portion 43 in an axial direction with respect to the rotational center axis C1.

As shown in FIG. 3, the chain engagement portion 41 is configured to engage with the bicycle chain 2. Specifically, the chain engagement portion 41 is configured to contact with the bicycle chain 2.

The chain engagement portion 41 is at least partly made of a second resin material. In this embodiment, the chain engagement portion 41 is made of the second resin material. The configuration of the second resin material is described below.

As shown in FIGS. 3 and 4, the chain engagement portion 41 is provided on the base portion 40. The chain engagement portion 41 is formed integrally with the base portion 40. For example, the chain engagement portion 41 is disposed on the outer peripheral portion of the base portion 40. The chain engagement portion 41 is molded integrally with the base portion 40.

The chain engagement portion 41 forms a plurality of teeth 45 (an example of at least one tooth) with the plurality of the protruding portions 43 of the base portion 40.

Specifically, the chain engagement portion 41 is formed in a substantially annular shape. The chain engagement portion 41 includes a plurality of second attachment portions 46. Each of the plurality of the second attachment portions 46 is provided on an inner peripheral portion of the chain engagement portion 41 at intervals in the circumferential direction D1.

Each of second attachment portions 46 is attached to the first attachment portion 44 of the base portion 40 (e.g. the protruding portions 43). For example, each of the second attachment portions 46 is formed in a substantially recessed shape. Each of the second attachment portions 46 is fit to the first attachment portion 44 of the base portion 40 (e.g. the protruding portions 43).

As shown in FIGS. 3 and 4, the chain engagement portion 41 further includes a plurality of first surfaces 47, a plurality of second surfaces 51, and a plurality of pairs of axially outer surfaces 48 (an example of at least one axially outer surface). Regarding to the guide pulley 36a, the first surface 47 is one example of a driving surface and the second surface 51 is one example of a non-driving surface. Regarding to the tension pulley 36b, the first surface 47 is one example of a non-driving surface and the second surface is one example of a driving surface.

Specifically, the chain engagement portion 41 includes a plurality of curving surfaces 49, a plurality of radially outermost surfaces 50, and a plurality of outer surface 48.

Each of the plurality of first surfaces 47 is configured to contact with the bicycle chain 2. Each of the first surfaces 47 is formed on each of the plurality of curving surfaces 49 on which a roller of the bicycle chain 2 is disposed. Each of the plurality of second surfaces 51 is configured to non-contact with the bicycle chain 2. Each of the second surfaces 51 is formed on each of the plurality of curving surfaces 49 on which a roller of the bicycle chain 2 is disposed. In other words, the curving surface 49 includes the first surface 47 and the second surface 51.

Regarding the guide pulley 36a, as shown in FIG. 3, the first surface 47 contacts with a roller of the bicycle chain 2 when the guide pulley 36a rotates in a clockwise direction with respect to the circumferential direction D1. On the other hand, regarding the tension pulley 36b, the second surface 51 contacts with a roller of the bicycle chain 2 when the tension pulley 36b rotates in a counter-clockwise direction with respect to the circumferential direction D1.

Each of the plurality of radially outermost surfaces 50 is continuously formed with the adjacent curving surfaces 49 between the adjacent curving surfaces 49 in the circumferential direction D1. The plurality of curving surfaces 49 and radially outermost surfaces 50 form an outer peripheral surface of the chain engagement portion 41.

The outer surfaces 48 are configured to respectively face link members (an example of at least one link member) of the bicycle chain 2 in an axial direction parallel to a rotational center axis C1 of the pulley 36.

Specifically, each of the outer surfaces 48 includes a first outer surface 48a and a second outer surface 48b. The first outer surface 48a faces one of a pair of link plates of the bicycle chain 2 in the axial direction. The second outer surface 48b faces the other of the pair of link plates of the bicycle chain 2 in the axial direction.

For example, the first outer surface 48a and the second outer surface 48b are continuously formed with the adjacent curving surfaces 49 between the adjacent curving surfaces 49 in the circumferential direction D1. The first outer surface 48a and the second outer surface 48b respectively form side surfaces on each of the plurality of teeth 45 of the guide pulley 36a. As shown in FIG. 3, a reference circle RC is defined to pass through a point between a radially outermost point RP of the pulley 36 and the rotational center axis C1. The radially outermost point RP is defined on the radially outermost surface 50. In this embodiment, the radially outermost point RP corresponds to a center point on the radially outermost surface 50 in the circumferential direction D1.

The base portion 40 is arranged between the rotational center axis C1 and the reference circle RC in the radial direction. Specifically, the base portion 40 is arranged between the rotational center axis C1 and the reference circle RC as viewed from the axial direction.

For example, the range, in which the base portion 40 is arranged, is set as follows. A proportion of a reference radius R1 of the reference circle RC to a radius R2 from the rotational center axis C1 to the radially outermost point RP is equal to or more than 0.3. Preferably, the proportion is equal to or more than 0.5.

The first resin material, of which the base portion 40 is made, has a first Young's modulus. The first Young's modulus is higher than a second Young's modulus (described below). For example, the first Young's modulus is a bending Young's modulus.

The second resin material, of which the chain engagement portion 41 is made, has a second Young's modulus. In other words, the first surfaces 47 and the axially outer surfaces 48 have the second Young's modulus.

The second Young's modulus is less than the first Young's modulus. For example, the second Young's modulus is a bending Young's modulus.

In case that the first Young's modulus is equal to or more than 500 MPa, the second Young's modulus is less than 500 MPa and is equal to or more than 20 MPa.

In case that the first Young's modulus is equal to or more than 1,200 MPa, the second Young's modulus is less than 1,200 MPa and is equal to or more than 20 MPa. Preferably, the second Young's modulus is less than 1,000 MPa and is equal to or more than 20 MPa. More preferably, the second Young's modulus is less than 800 MPa and is equal to or more than 20 MPa.

In the above cases, preferably, a difference between the first Young's modulus and the second Young's modulus is equal to or larger than 100 MPa.

Another Variation 1

In the above embodiment, explanation is performed as an example that the first attachment portion 44 of the protruding portion 43 is formed on the distal end of the protruding portion 43 on the base portion 40. In other words, the first attachment portions 44 (the distal ends) of the protruding portions 43 of the base portion 40 are covered by the chain engagement portion 41.

Figure 5:
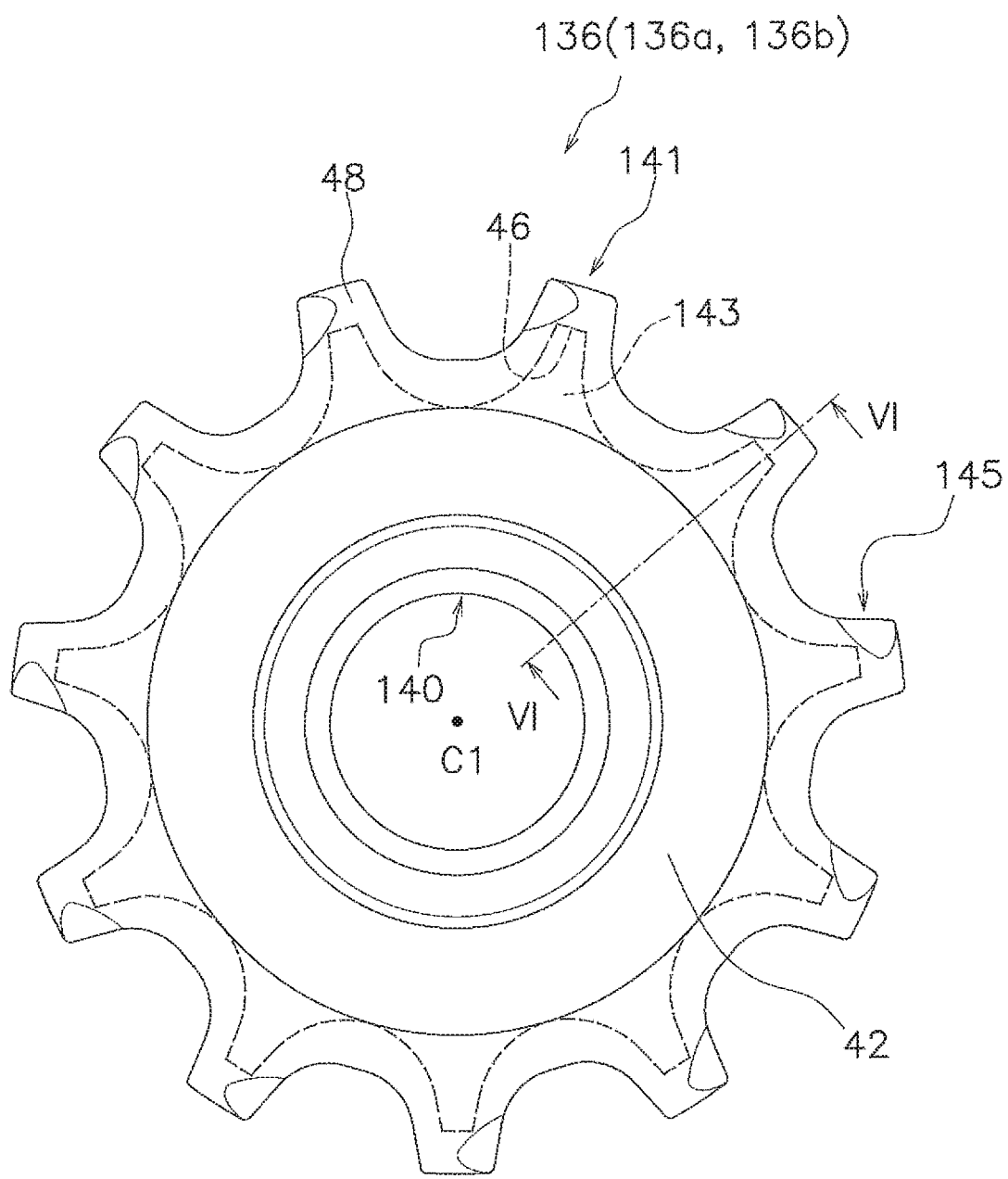
FIG. 5 is a side view of the pulley according to another variation 1 of the embodiment.
Figure 6:
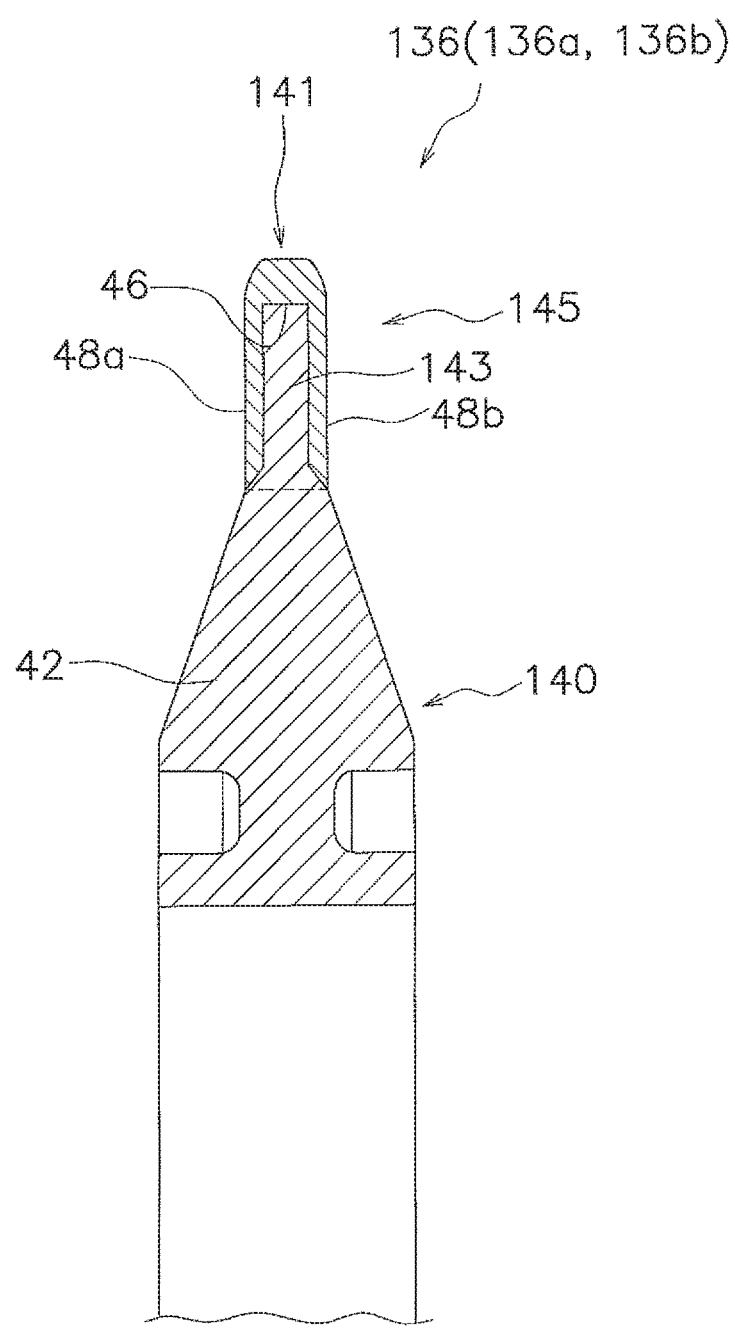
FIG. 6 is a partially enlarged cross-sectional view of the pulley according to the another variation 1 of the embodiment taken along line VI-VI of FIG. 5.

According to a guide pulley 136a and a tension pulley 136b of a pulley assembly 136 with respect to another variation 1, the whole of a protruding portion 143 may be used as the first attachment portion, as shown in FIGS. 5 and 6. In this case, for example, a plurality of teeth 145 are formed by a chain engagement portion 141 and the plurality of the protruding portions 143 (the first attachment portion). In other words, the whole of the protruding portions 143 are covered by the chain engagement portion 141.

In this variation, an explanation of the same configuration as the above embodiment is omitted. The symbol of the same configuration is the same as one of the above embodiment.

Another Variation 2

In the above embodiment, explanation is performed as an example that the plurality of teeth 45 are formed by the chain engagement portion 41 and the plurality of protruding portions 43 of the base portion 40.

Figure 7:
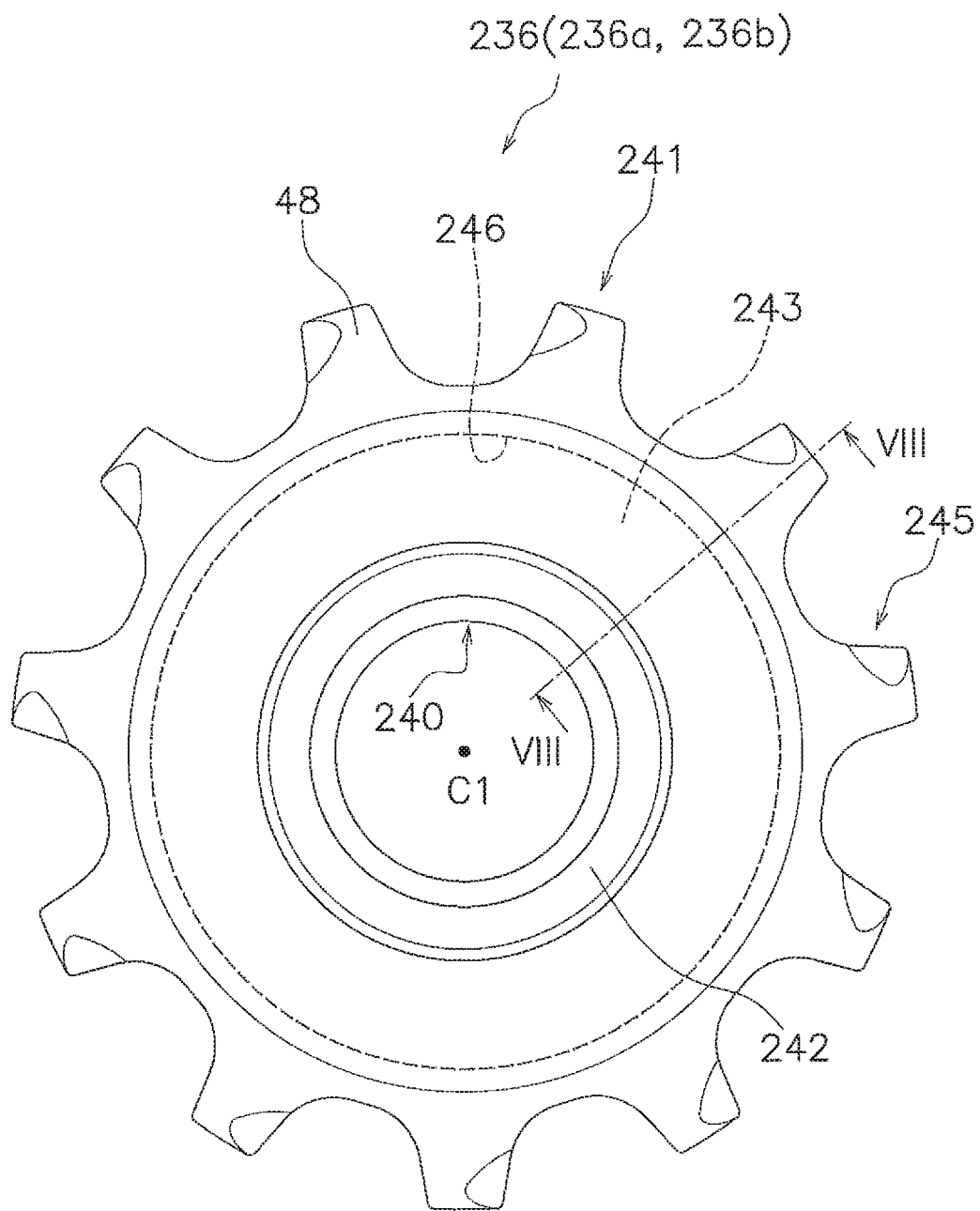
FIG. 7 is a side view of a pulley according to another variation 2 of the embodiment.
Figure 8:
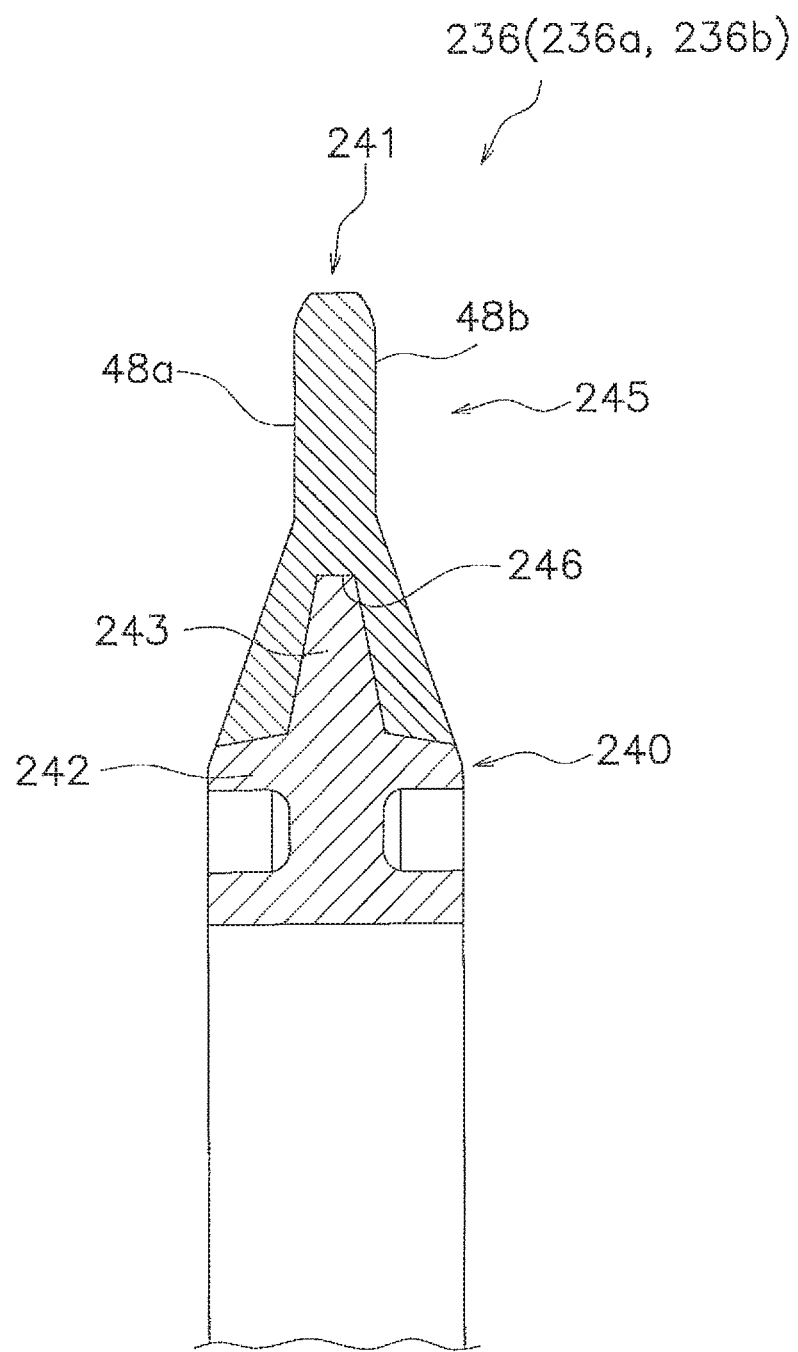
FIG. 8 is a partially enlarged cross-sectional view of the pulley according to the another variation 2 of the embodiment taken along line VIII-VIII of FIG. 7.

According to a guide pulley 236a and a tension pulley 236b of a pulley assembly 236 with respect to another variation 2, the plurality of teeth 245 may be formed by the chain engagement portion 241 only, as shown in FIGS. 7 and 8.

In this case, for example, the base portion 240 includes a disc portion 242 and a protruding portion 243. The protruding portion 243 is formed in a substantially annular shape and protrudes from the disc portion 242. The protruding portion 243 is mounted to a second attachment portion 246 of the chain engagement portion 241. The second attachment portion 246 is disposed on an inner peripheral side of the plurality of teeth 245. The second attachment portion 246 is provided on an inner peripheral portion of the chain engagement portion 241. The second attachment portion 246 is formed in a substantially annular groove shape.

In this variation, an explanation of the same configuration as the above embodiment is omitted. The symbol of the same configuration is the same as one of the above embodiment.

Another Variation 3

In the above embodiment, explanation is performed as an example that the outer peripheral surface of the pulley 36 is formed by the chain engagement portion 41 only.

Figure 9:
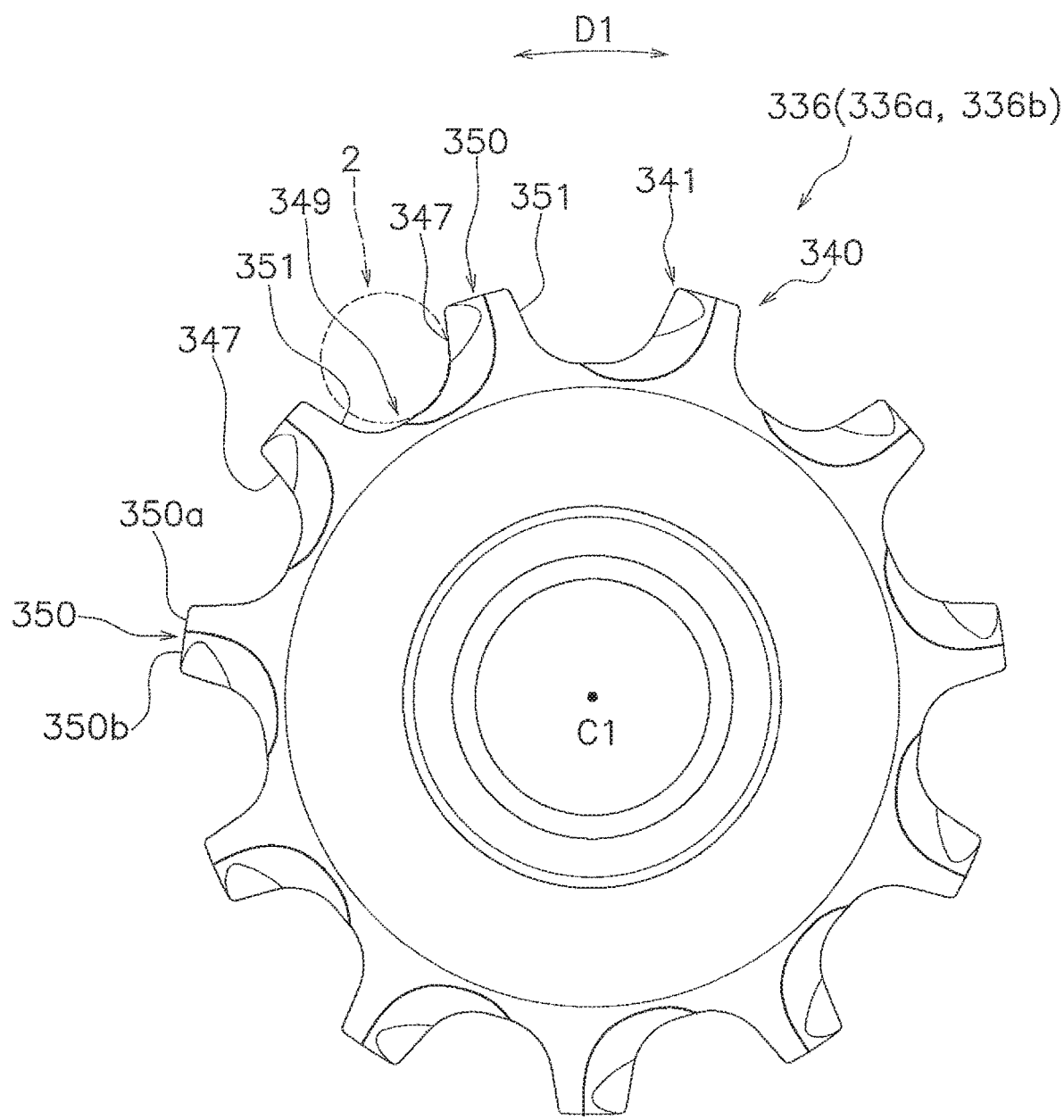
FIG. 9 is a side view of a pulley according to another variation 3 of the embodiment.

According to a guide pulley 336a and a tension pulley 336b of a pulley assembly 336 with respect to another variation 3, the outer peripheral surface of the guide pulley 336a and/or tension pulley 336b may be formed by the base portion 340 and the chain engagement portion 341, as shown in FIG. 9. In this case, for example, the guide pulley 336a and/or tension pulley 336b includes a base portion 340 and a plurality of chain engagement portions 341.

The base portion 340 includes a plurality of second surfaces 351. The second surface 351 has the first Young's modulus. Each of the plurality of chain engagement portions 341 includes a first surface 347. The first surface 347 has the second Young's modulus. Each of the plurality of first surfaces 347 and each of the plurality of second surfaces 351 form each of the curving surfaces 349.

The radially outermost surface 350 is formed by a radially outermost surface 350a of the base portion 340 and a radially outermost surface 350b of the chain engagement portion 341.

In this variation, an explanation of the same configuration as the above embodiment is omitted. The omitted configuration is equivalent to the configuration described in the above embodiment.

Other Embodiment (A) In the above embodiment, explanation is performed as an example that the base portion 40, 140, 240, 340 and the chain engagement portion 41, 141, 241, 341 include the above Young's modulus (the first and second Young's modulus).

The base portion 40, 140, 240, 340 and the chain engagement portion 41, 141, 241, 341 may include a Young's modulus as follows.

A first Young's modulus of the base portion 40, 140, 240, 340 and a second Young's modulus of at least one chain engagement portion 41, 141, 241, 341 are equal to or less than 1,200 MPa.

In this case, for example, the first Young's modulus of the base portion 40, 140, 240, 340 and the second Young's modulus of at least one chain engagement portion 41, 141, 241, 341 are equal to or less than 1,200 MPa, and are equal to or more than 20 MPa.

In another case, for example, the first Young's modulus of the base portion 40, 140, 240, 340 and the second Young's modulus of at least one chain engagement portion 41, 141, 241, 341 are equal to or less than 1,200 MPa, and are equal to or more than 1,000 MPa.

In another case, for example, the first Young's modulus of the base portion 40, 140, 240, 340 and the second Young's modulus of at least one chain engagement portion 41, 141, 241, 341 are equal to or less than 800 MPa, and are equal to or more than 20 MPa.

In another case, for example, the first Young's modulus of the base portion 40, 140, 240, 340 and the second Young's modulus of at least one chain engagement portion 41, 141, 241, 341 are equal to or less than 800 MPa, and are equal to or more than 1,000 MPa.

(B) In the above embodiment, explanation is performed as an example that the pulley 36, 336 includes a plurality of teeth 45, 145, 245.

Figure 10:
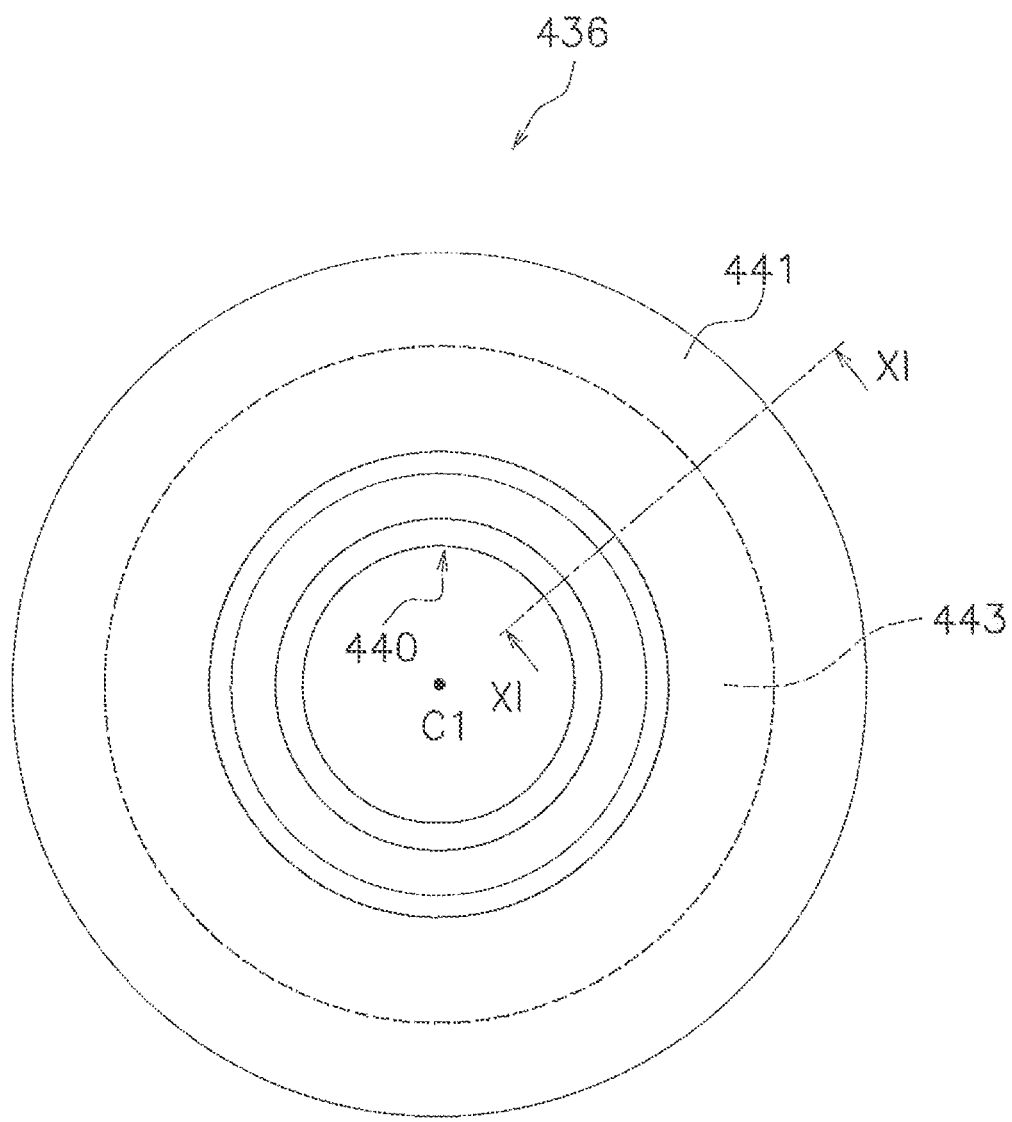
FIG. 10 is a side view of a pulley according to the other embodiment of the present invention.
Figure 11:
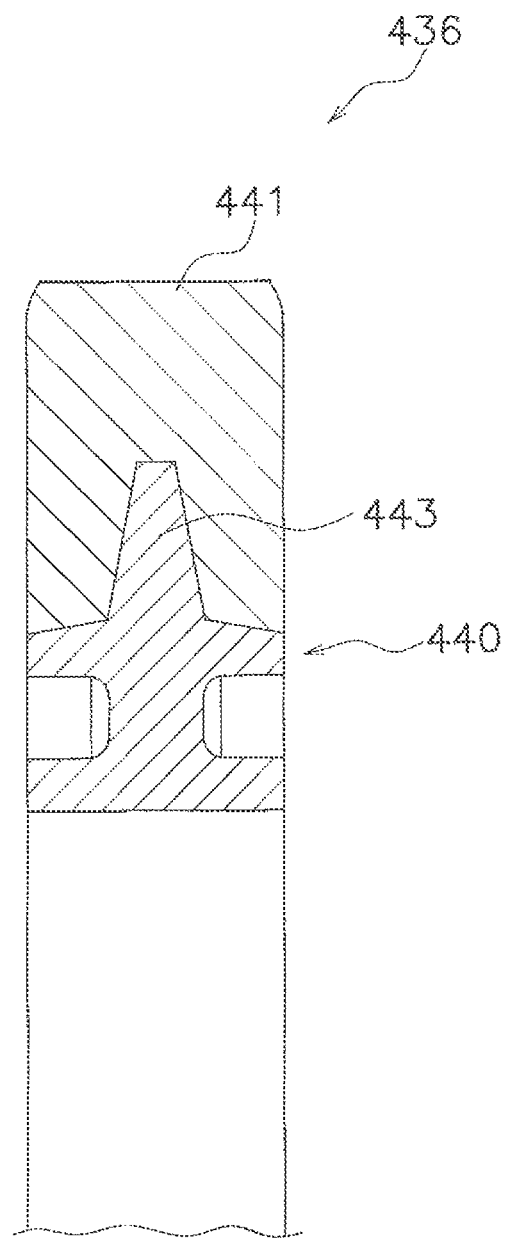
FIG. 11 is a partially enlarged cross-sectional view of the pulley according to the other embodiment of the present invention taken along line XI-XI of FIG. 10.

The configuration of the pulley 36, 336 may be applied to a pulley 436 without the teeth 45, as shown in FIGS. 10 and 11. In this case, the chain engagement portion 441 is provided on a radial outside of the base portion 440 with respect to the rotational center axis C1. The chain engagement portion 441 is formed in a substantially annular shape. The chain engagement portion 441 is mounted to the base portion 440 via a protruding portion 443. The chain engagement portion 441 is mounted to the base portion 440 such as covering the base portion 440.

(C) In the above embodiment, explanation is performed as an example that each of the base portion 40, 140, 240, 340, 440 and the chain engagement portion 41, 141, 241, 341, 441 is made of the resin material.

At least one of the base portion 40, 140, 240, 340, 440 and the chain engagement portion 41, 141, 241, 341, 441 may be made of at least partly made of a resin material. For example, at least one of the base portion 40, 140, 240, 340, 440 and the chain engagement portion 41, 141, 241, 341, 441 is made of a composite material including a resin material and a metal material.

(D) In the above embodiment, explanation is performed as an example that the base portion 40, 140, 240, 340, 440 is made of the first resin material and the chain engagement portion 41, 141, 241, 341, 441 is made of the second resin material.

The first resin material may be different from the second resin material and may be the same as the second resin material, if the first Young's modulus and the second Young's modulus include a Young's modulus as described above.

(E) In the above embodiment, explanation is performed as an example that the pulley 36, 336 includes the base portion 40, 140, 240, 340, 440 and the chain engagement portion 41, 141, 241, 341, 441. The configuration of the pulley assembly 36 may be applied to a bicycle rear and front sprockets.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

The foregoing also applies to words having similar meanings such as the terms, "including", "having" and their derivatives. Also, the terms "part," "section," "portion," "member" or "element" when used in the singular can have the dual meaning of a single part or a plurality of parts.

Also as used herein to describe the above embodiment(s), the following directional terms "forward", "rearward", "above", "downward", "vertical", "horizontal", "below", "transverse", "inward" and "outward" as well as any other similar directional terms refer to those directions of the bicycle rotor in a state where the bicycle rotor is mounted to a bicycle. Accordingly, these terms, as utilized to describe the present technology should be interpreted relative to the bicycle rotor.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims.

For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time.

Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

What is claimed is:

1. A bicycle derailleur comprising:
   a bicycle rotor including
      a base portion configured to rotate around a rotational center axis of the bicycle rotor and at least partly made of a first resin material having a first Young's modulus, the base portion including at least one protruding portion extending radially outwardly from the rotational center axis and made of the first resin, the base portion further including a disc portion disposed radially inside the protruding portion, the disc portion being integral with the protruding portion, and
      at least one chain engagement portion provided on the base portion, the at least one chain engagement portion at least partly made of a second resin material having a second Young's modulus, with the first Young's modulus being higher than the second Young's modulus; and
   a chain guide including chain guide plates to which the bicycle rotor is rotatably mounted,
   wherein the at least one chain engagement portion has a curved surface configured to receive a roller of a bicycle chain, and the base portion has a curved surface which corresponds to the curved surface of the at least one chain engagement portion,
   the curved surface of the at least one chain engagement portion includes a first surface configured to be in contact with the roller and a second surface configured to be in non-contact with the roller in a state where the curved surface of the at least one chain engagement portion receives the roller,
   an axial dimension of the disc portion is larger than an axial dimension of the protruding portion,
   the protruding portion has a first axially outer tapered surface and a second axially outer tapered surface opposing the first axially outer tapered surface such that the axial dimension of the protruding portion decreases radially outwardly, and
   the at least one chain engagement portion directly contacts both the first axially outer tapered surface and the second axially outer tapered surface.

2. The bicycle derailleur according to claim 1, wherein the at least one chain engagement portion has a driving surface configured to contact with a bicycle chain, and the driving surface has the second Young's modulus.

3. The bicycle derailleur according to claim 1, wherein each of the first Young's modulus and the second Young's modulus is a bending Young's modulus.

4. The bicycle derailleur according to claim 1, wherein the first Young's modulus is equal to or more than 500 MPa.

5. The bicycle derailleur according to claim 4, wherein the first Young's modulus is equal to or more than 1,200 MPa.

6. The bicycle derailleur according to claim 1, wherein the second Young's modulus is less than 1,200 MPa.

7. The bicycle derailleur according to claim 1, wherein the second Young's modulus is less than 1,000 MPa.

8. The bicycle derailleur according to claim 1, wherein the second Young's modulus is less than 800 MPa.

9. The bicycle derailleur according to claim 1, wherein the second Young's modulus is equal to or more than 20 MPa.

10. The bicycle derailleur according to claim 1, wherein a difference between the first Young's modulus and the second Young's modulus is equal to or larger than 100 MPa.

11. The bicycle derailleur according to claim 1, wherein the at least one chain engagement portion forms at least one tooth.

12. The bicycle derailleur according to claim 1, wherein the at least one chain engagement portion has a driving surface configured to contact with a roller of a bicycle chain.

13. The bicycle derailleur according to claim 12, wherein the at least one chain engagement portion further includes at least one axially outer surface facing at least one link member of the bicycle chain in an axial direction parallel to the rotational center axis of the bicycle rotor, and the at least one axially outer surface has the second Young's modulus.

14. The bicycle derailleur according to claim 13, wherein the at least one axially outer surface includes a first axially outer surface and a second axially outer surface, the first axially outer surface faces one of a pair of link members of the bicycle chain in the axial direction, and the second axially outer surface faces the other of the pair of link members of the bicycle chain in the axial direction.

15. The bicycle derailleur according to claim 1, wherein the at least one chain engagement portion is provided on a radial outside of the base portion with respect to the rotational center axis and is formed in a substantially annular shape.

16. The bicycle derailleur according to claim 1, wherein a reference circle is defined to pass through a point between a radially outermost point of the rotor and the rotational center axis, and the base portion is arranged between the rotational center axis and the reference circle in a radial direction.

17. The bicycle derailleur according to claim 16, wherein a proportion of a reference radius of the reference circle to a radius from the rotational center axis to the radially outermost point is equal to or more than 0.3.

18. The bicycle derailleur according to claim 17, wherein the proportion is equal to or more than 0.5.

19. A bicycle derailleur comprising:
a bicycle rotor including
  a base portion configured to rotate around a rotational center axis of the bicycle rotor and at least partly made of a first resin material having a first Young's modulus, the base portion including at least one protruding portion extending radially outwardly from the rotational center axis and made of the first resin, and
  at least one chain engagement portion provided on the base portion, the at least one chain engagement portion at least partly made of a second resin material having a second Young's modulus, with the first Young's modulus being higher than the second Young's modulus; and
a chain guide including chain guide plates to which the bicycle rotor is rotatably mounted,
wherein the base portion and the at least one chain engagement portion form at least one tooth, the at least one tooth includes a non-driving surface of the base portion and a driving surface of the at least one chain engagement portion, and the non-driving surface has the first Young's modulus.

20. A bicycle derailleur comprising:
a bicycle rotor including
  a base portion configured to rotate around a rotational center axis of the bicycle rotor, the base portion including at least one protruding portion extending radially outwardly from the rotational center axis, the base portion further including a disc portion disposed radially inside the protruding portion, the disc portion being integral with the protruding portion, and
  at least one chain engagement portion formed integrally with the base portion and to contact with a bicycle chain, a Young's modulus of the base portion and the at least one chain engagement portion being equal to or less than 1,200 MPa; and
a chain guide including chain guide plates to which the bicycle rotor is rotatably mounted,
wherein the at least one chain engagement portion has a curved surface configured to receive a roller of a bicycle chain, and the base portion has a curved surface which corresponds to the curved surface of the at least one chain engagement portion, the curved surface of the at least one chain engagement portion includes a first surface configured to be in contact with the roller and a second surface configured to be in non-contact with the roller in a state where the curved surface of the at least one chain engagement portion receives the roller, an axial dimension of the disc portion is larger than an axial dimension of the protruding portion, the protruding portion has a first axially outer tapered surface and a second axially outer tapered surface opposing the first axially outer tapered surface such that the axial dimension of the protruding portion decreases radially outwardly, and the at least one chain engagement portion directly contacts both the first axially outer tapered surface and the second axially outer tapered surface.

21. The bicycle derailleur according to claim 20, wherein the Young's modulus is equal to or more than 1,000 MPa.

22. The bicycle derailleur according to claim 20, wherein the Young's modulus is equal to or less than 800 MPa.

23. The bicycle derailleur according to claim 20, wherein the Young's modulus is equal to or more than 20 MPa.

* * * * *